US012706952B1

(12) United States Patent
Acharya

(10) Patent No.: US 12,706,952 B1
(45) Date of Patent: Aug. 11, 2026

(54) LARGE LANGUAGE MODEL POWERED SOCIAL INTEGRITY SYSTEM

(71) Applicant: Sony Interactive Entertainment Inc., Tokyo (JP)

(72) Inventor: Vinit Acharya, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 246 days.

(21) Appl. No.: 18/314,775

(22) Filed: May 9, 2023

(51) Int. Cl.
*H04L 9/40* (2022.01)

(52) U.S. Cl.
CPC ...... *H04L 63/1491* (2013.01); *H04L 63/1425* (2013.01)

(58) Field of Classification Search
CPC ........................ H04L 63/1491; H04L 63/1425
See application file for complete search history.

(56) References Cited

U.S. PATENT DOCUMENTS 8,856,928 B1 * 10/2014 Rivner .................. G06Q 50/01 713/193
10,298,700 B2 * 5/2019 Borden .................... H04L 9/40
2002/0138271 A1 9/2002 Shaw
2015/0326608 A1 * 11/2015 Shabtai .............. H04L 63/1491 726/23
2017/0155666 A1 6/2017 Seul et al.
2019/0065748 A1 2/2019 Foster et al.
2019/0342406 A1 * 11/2019 Borden ................ H04L 67/535
2020/0233974 A1 7/2020 Miron et al.
2022/0094702 A1 * 3/2022 Saad Ahmed ...... H04L 63/1416
2023/0259705 A1 * 8/2023 Tunstall-Pedoe .... G06N 3/0499 704/9
2023/0321548 A1 * 10/2023 Vogel ...................... A63F 13/67 463/42
2023/0421576 A1 * 12/2023 Tav ..................... H04L 63/1491
2024/0249318 A1 * 7/2024 Spiegel ................... H04L 51/02

(Continued)

FOREIGN PATENT DOCUMENTS

CN 113422761 A * 9/2021

OTHER PUBLICATIONS

A. Dhoka, S. Pachauri, C. Nigam and S. Chouhan, "Machine Learning and Speech Analysis Framework for Protecting Children against Harmful Online Content," Mar. 2023 Second International Conference on Electronics and Renewable Systems (ICEARS), pp. 1420-1424 (Year: 2023).*

(Continued)

*Primary Examiner* — Amir Mehrmanesh
*Assistant Examiner* — Thomas A Gyorfi
(74) *Attorney, Agent, or Firm* — Kilpatrick Townsend & Stockton LLP

(57) ABSTRACT

A pseudo account is set up to mimic a potential victim's demographic messaging behavior while seeming completely legitimate to an anti-social (AS) user. This can entail mimicking the messaging behavior of minors and presenting that behavior where AS users look for it. The AS account establishes communication with the pseudo account. The AS account may be flagged as suspicious, and the system can wait for the AS user to make an initial move on a legitimate account and report it before any undesirable communication takes place. The pseudo account can be controlled by a large language model (LLM) such as a generative pre-trained transformer (GPTT).

20 Claims, 7 Drawing Sheets

(56) References Cited

U.S. PATENT DOCUMENTS

2024/0267344 A1* 8/2024 Mulligan ................ H04L 51/04
2024/0372885 A1* 11/2024 Moore .................... G06F 40/56

OTHER PUBLICATIONS

English language translation of Chinese Patent Publication CN-113422761-A (13 pages) (Year: 2021).*
Joon Sung Park et al. "Social Simulacra: Creating Populated Prototypes for Social Computing Systems" 35th Annual ACM Symposium on User Interface Software and Technology [UIST '22] (18 pages) (Year: 2022).*
Xin Ruan et al. "Profiling Online Social Behaviors for Compromised Account Detection" IEEE Transactions on Information Forensics and Security, vol. 11, No. 1, Jan. 2016 (pp. 176-187) (Year: 2016).*
Wikipedia article for "Chatbot", originally published May 2, 2022 (6 pages) https://en.wikipedia.org/w/index.php?title=Chatbot&oldid=1085810100 (Year: 2022).*
"International Search Report and Written Opinion", dated Aug. 22, 2024, from the counterpart PCT application PCT/US24/027968.

* cited by examiner

AS : Hi
PA : How's It Going?
AS : Just Chilling
PA : Great! Any Plans?
AS : I Can Pick You Up For Ice Cream
PA : Thanks But Daddy Says I Shouldn't
AS : I Wouldn't Stop You from Making Friends
PA : Thanks Daddy Is Such A Drip
AS : You Sound Smart. Do You Have A Pic To Send?

LARGE LANGUAGE MODEL POWERED SOCIAL INTEGRITY SYSTEM

FIELD

The present application relates generally to large language model powered social integrity systems.

BACKGROUND

Social computer networks, including computer game networks face the challenge of detecting and reporting accounts that engage in malicious activities, referred to herein as anti-social behavior or activity. These accounts can pose a significant danger to a large portion of the user demographic, such as minors. Currently, a reactive approach to the problem is used and there's no way to detect and flag these accounts proactively. Only after an anti-social user has reached out to the victim and has made them feel uncomfortable or worse, is the anti-social behavior detected and reported.

SUMMARY

As understood herein, a pseudo account can be used whose user is impersonated by a generative network in which a decoy account or network is deployed to identify accounts of anti-social users (AS accounts of AS users) such as spammers, scammers, computer game cheaters, and possible predators by subtly exposing some vulnerability (while appearing completely legitimate to the AS account) acting as a lure for any such AS users. A pseudo account is set up to mimic a potential victim's demographic while seeming completely legitimate. This can entail mimicking certain messaging behavior and presenting that behavior where users not exhibiting social norms look for it. The AS account establishes communication with the pseudo account. The AS account may be flagged as suspicious, and the system can wait for the AS account to make an initial move on a legitimate account and report it before any undesirable communication takes place. The pseudo account can be controlled by a large language model (LLM) such as a generative neural network such as a generative pre-trained transformer (GPTT).

Accordingly, a system includes at least one computer medium that is not a transitory signal and that in turn includes instructions executable by at least one processor assembly to establish a pseudo account in at least one social network. The pseudo account accesses at least one large language model (LLM) such as a generative neural network. The instructions are executable to identify a first account establishing communication with the pseudo account, and to indicate that the first account is suspicious without blocking the first account or presenting a warning about the first account to a user of the social network. The instructions are executable to wait for the first account to make an initial move on a user account, and then present an indication to at least one social network account that the first account is potentially anti-social.

In some examples, the social network account to which the indication that the first account is potentially anti-social is presented includes at least the user account. In addition or alternatively, the social network account to which the indication that the first account is potentially anti-social is presented may include at least a social network administrator account.

The LLM may include a generative neural network. The generative neural network may include at least one generative pre-trained transformer (GPTT). The LLM may be trained to mimic a behavior of a demographic associated with potential victims to the first account, such as a demographic associated with potential victims.

In non-limiting embodiments the instructions can be executable to present the indication to the at least one social network account before any communication takes place by the first account with the user account.

In another aspect, a method includes using at least one neural network (NN) to communicate with at least one potential anti-social (AS) account of a social network. The method also includes receiving from the NN at least one indication that the AS account exhibits a first characteristic, e.g., anti-social behavior such as spamming, scamming, predatory behavior, game cheating behavior, and responsive to receiving the indication from the NN, flagging the AS account without blocking the AS account from the social network. The method includes warning at least one user account on the social network with whom the AS account attempts to communicate that the AS account is problematic.

In some implementations the method may include, responsive to N user complaints regarding the AS account and/or plural indications from the NN that the AS account exhibits the first characteristic in respective plural communication sessions between the NN and the AS account, suspending the AS account from the social network.

In another aspect, an apparatus includes at least one processor assembly configured to execute at least one large language model (LLM) to communicate with at least a first account on at least one social network. The LLM mimics messaging behavior of a demographic group. The processor is configured to receive from the LLM indication as to whether the first account is problematic based at least in part on communication between the LLM and the first account, and responsive to an indication that the first account is problematic, present a warning on a computer of the social network other than a computer hosting the first account.

The warning may be presented on a computer hosting a user account with which the first account attempts to communicate and/or on a computer hosting a parent account associated with a user account with which the first account attempts to communicate and/or on a computer hosting a social network administrator account.

In some examples the processor can be configured to provide to the computer of the social network other than a computer hosting the first account at least one selector selectable to block the first account. Also, the processor may be configured to provide to the first account an indication that the first account may be problematic. Along with the warning, the processor may be configured to provide an option to contact an administrator of the social network.

The details of the present application, both as to its structure and operation, can be best understood in reference to the accompanying drawings, in which like reference numerals refer to like parts, and in which:

DETAILED DESCRIPTION

Figure 1:
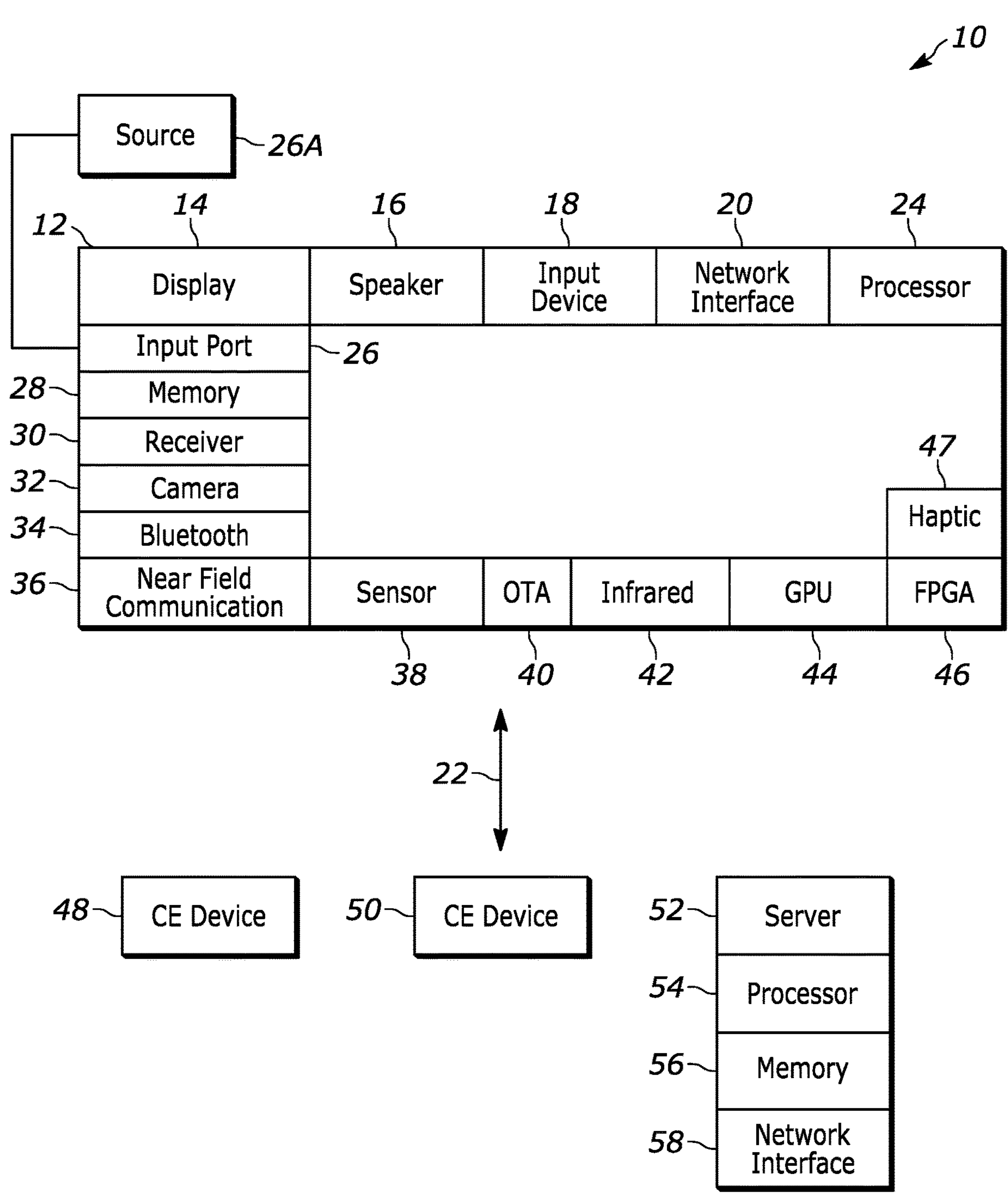
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers. A processor assembly may include one or more processors acting independently or in concert with each other to execute an algorithm.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26*a* of audio video content. Thus, the source 26*a* may be a separate or integrated set top box, or a satellite receiver. Or the source 26*a* may be a game console or disk player containing content. The source 26*a*, when implemented as a game console, may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. However, a preferred network contemplated herein is a large language model (LLM). One example of a LLM is a generative pre-trained transformer (GPTT) that is trained using unsupervised training techniques described herein.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
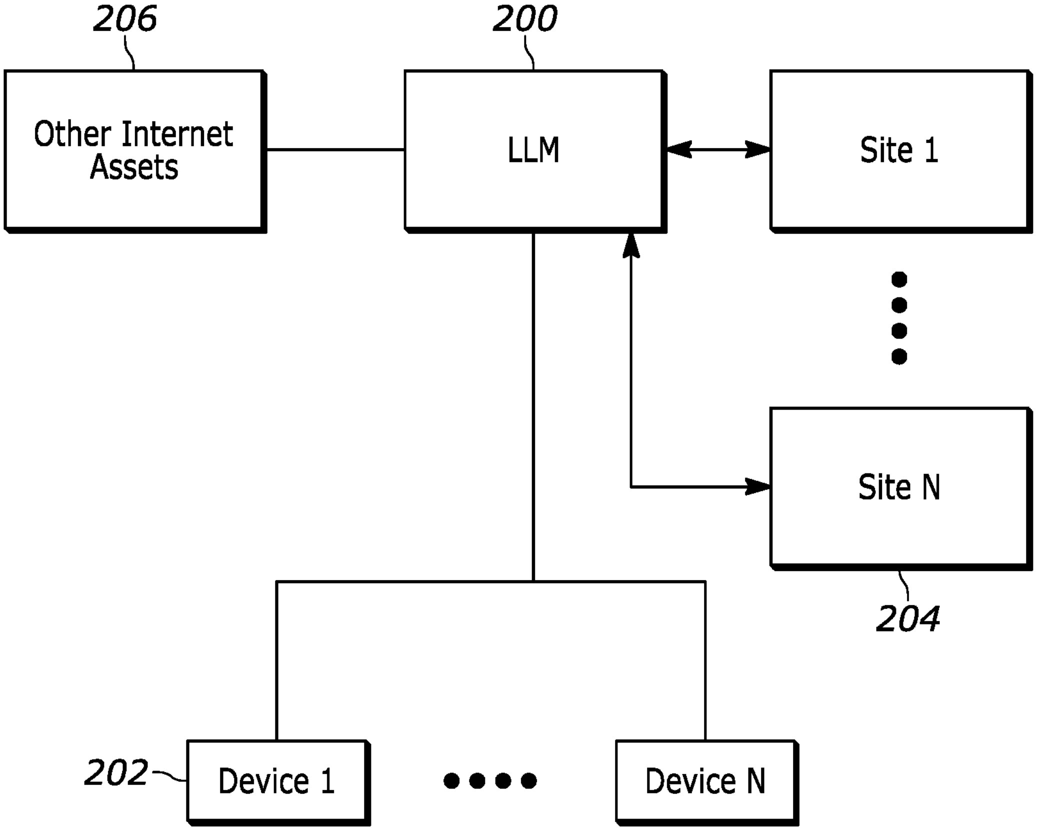
FIG. 2 illustrates a game advice system employing a large language model (LLM) such as a generative pre-trained transformer (GPTT) consistent with present principles.

Turning to FIG. 2, in general, a LLM such as a generative pre-trained transformer (GPTT) 200 such as may be referred to as a "chatbot" receives queries from user computer devices 202 and based on being trained on a wide corpus of documents including gamer comments on various sites 204 such as social media sites as well as other Internet assets 206, returns a response in natural human language either spoken or written. It is to be understood that a GPTT is used as but one example of an LLM.

Figure 3:
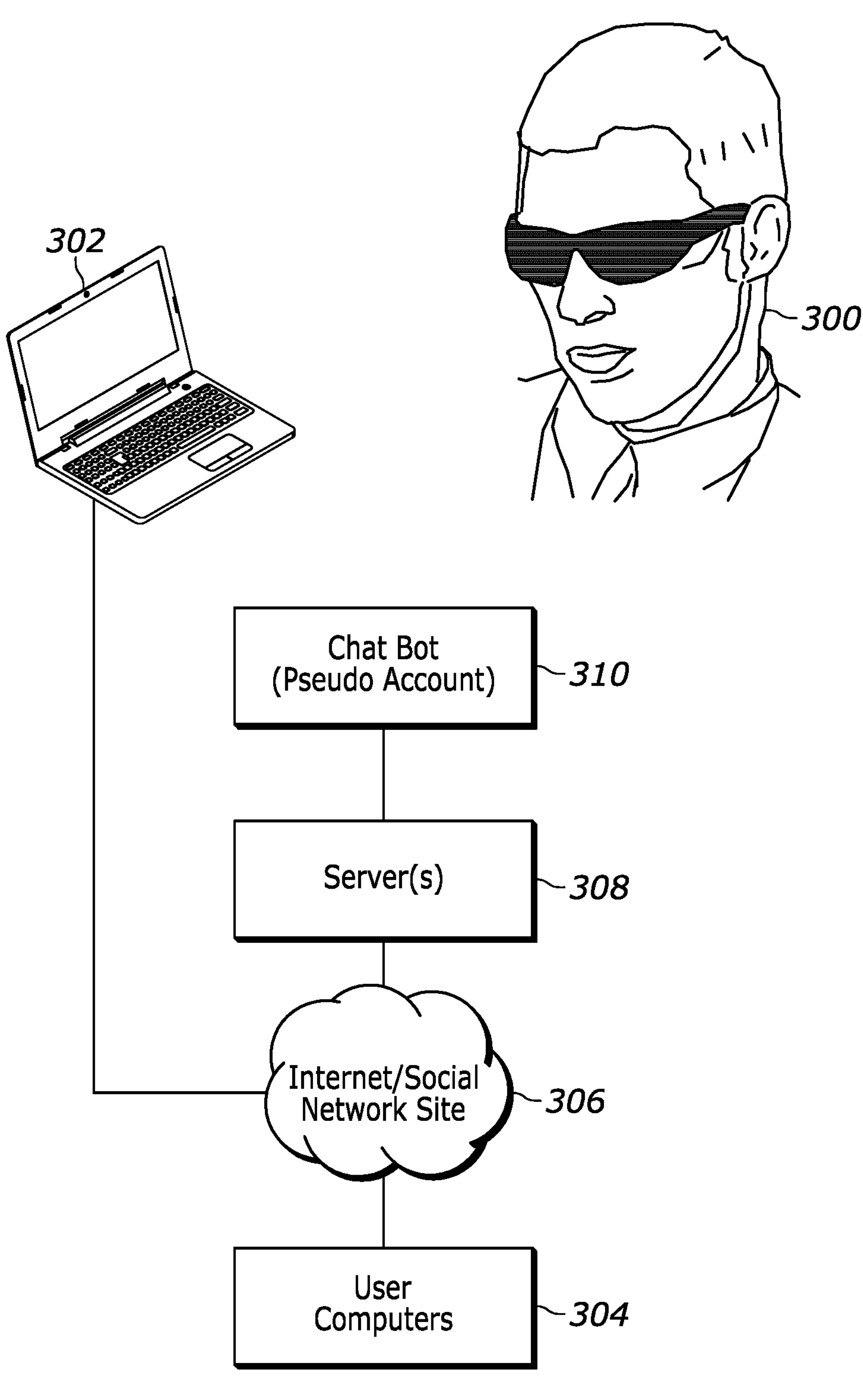
FIG. 3 illustrates an example social network system consistent with present principles.

Refer now to FIG. 3. An anti-social (AS) user 300 operates a potential anti-social (AS) computer 302 connected to other user computers 304 on a social network site 306 via the Internet. One or more servers or other computer types 308 also may access the site 306. The servers or other computer types 308 may execute a LLM such as a generative network 310 such as a generative pre-trained (GPTT) network that may be referred to as a "pseudo account (PA) chatbot" to conduct messaging with the AS computer 302 using a pseudo account (PA) on the site 306.

Figure 3A:
FIG. 3A illustrates a screen shot of example messaging between a potential anti-social account and a pseudo-account controlled by a generative neural network.

FIG. 3A illustrates a sequence of such messaging, in which the AS user 300 sends messages that are automatically responded to by the example GPTT via the PA. The messages are presented on the display of the AS computer 302 operated by the AS user 300 shown in FIG. 3.

It is to be appreciated that the LLM such as a GPTT is trained on a large corpus of messages representing anti-social user messages and legitimate user messages, typically by demographic. For example, the legitimate user demographics may be potential victim demographics such as "girl, under age 10" or "boy, age 12-14" and may include additional demographic details. The LLM thus may impersonate one of several victim demographics through the PA.

Figure 4:
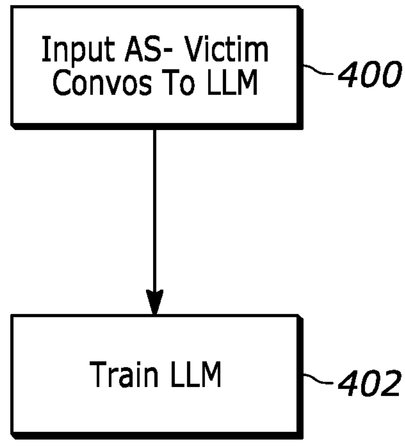
FIG. 4 illustrates example logic in example flow chart format for training the LLM.

FIG. 4 illustrates. Predator/victim message strings are input to the LLM such as a GPTT at block 400 to train the LLM at block 402. The message strings may be tagged with ground truth ("predator", "not predator", "not victim", "victim demographic A", "victim demographic B", "spammer", "scammer", "game cheater", etc.).

Figure 5:
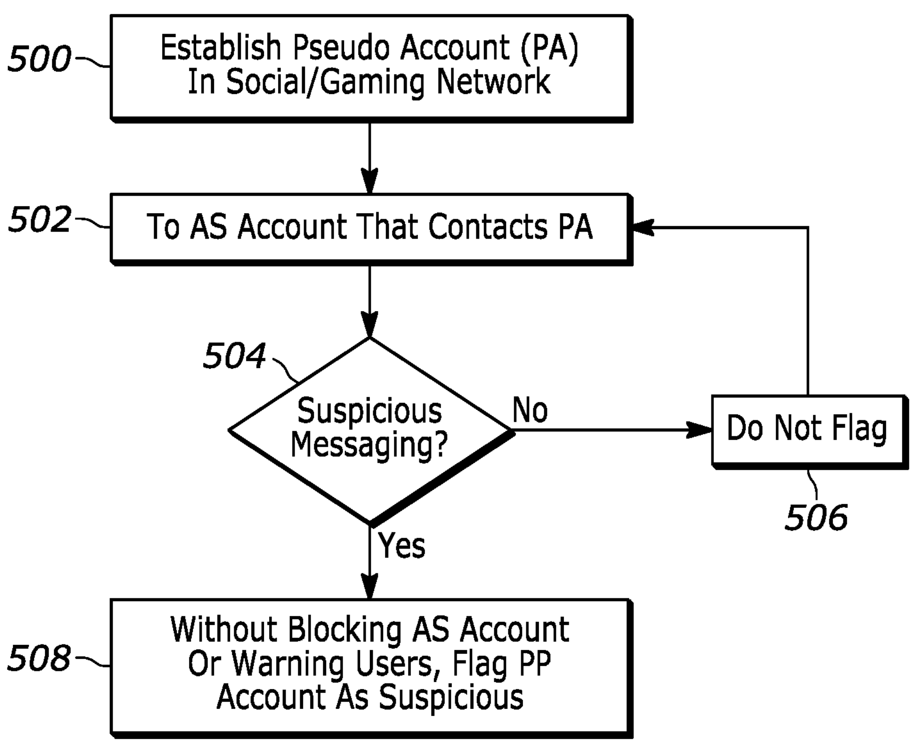
FIG. 5 illustrates example logic in example flow chart format for using the LLM to identify an anti-social (AS) account.

FIG. 5 illustrates that once the LLM is trained, it may be used to detect AS users on the social network as follows. The pseudo account (PA) of the LLM is established at block 500 by, e.g., a network administrator. The network may be, for instance, a computer gaming network. In establishing the PA, the network administrator may program the LLM with an "identity" based on the demographic the administrator wishes the LLM to mimic. An example is:

Name: Sarah Lisbon
Age: 13
Birth date: Jan. 19, 2010
Your PSN Username: @BTSGirl
Mother: Works for a tech company and drops you at school at 7 AM and leaves for work and comes back at 5 PM.
Father: Works for a tech company and leaves for work at 6 AM and comes back at 5:30 PM.
Your favorite games: Fortnite, Fall Guys Moving to block 502, based on the content of messages from an account attempting to message the PA, the account is identified as an AS account at block 502.

Moving to state 504, it is determined whether the AS account is indeed exhibiting suspicious behavior in its messaging. If not, the account is ignored by, among other things, not flagging the account as anti-social at block 506. However, if the messaging from the account is suspicious, it is flagged as anti-social at block 508 but without yet immediately blocking the AS account or warning other users of the social network, to avoid false positives of legitimate users.

Figure 6:
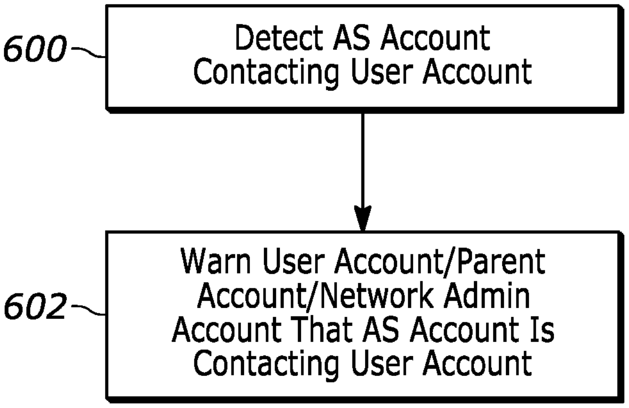
FIG. 6 illustrates example logic in example flow chart format for warning social network accounts about the AS account.

On the other hand, FIG. 6 illustrates that in some embodiments, once the AS user attempts to contact a user account at block 600, one or more other accounts of the social network may be advised or warned that the AS account is a suspicious account at block 602. The account receiving the advisory or warning may be the user account being contacted, and/or an account of a parent associated with the user of the account being contacted, and/or a network administrator account.

Figure 7:
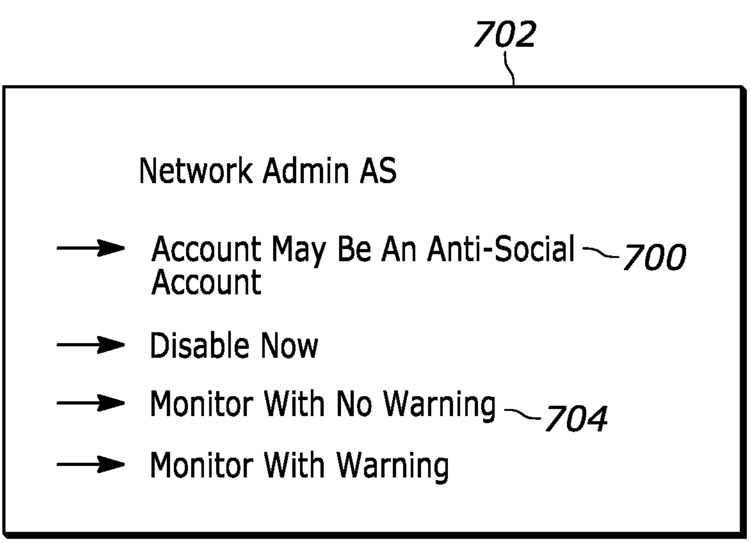
FIG. 7 illustrates an example screen shot from a network administrator computer regarding the AS account.

FIG. 7 illustrates such an advisory 700 that can be audibly or visibly presented on a display 702 of a computer logged in to a network administrator account. One or more selectors 704 may be presented and may be selected by an administrator to disable the AS account immediately, surreptitiously monitor the messaging of the AS account without warning the AS account, monitor the messaging of the AS user along with warning the AS account it is being monitored, or other actions.

Figure 8:
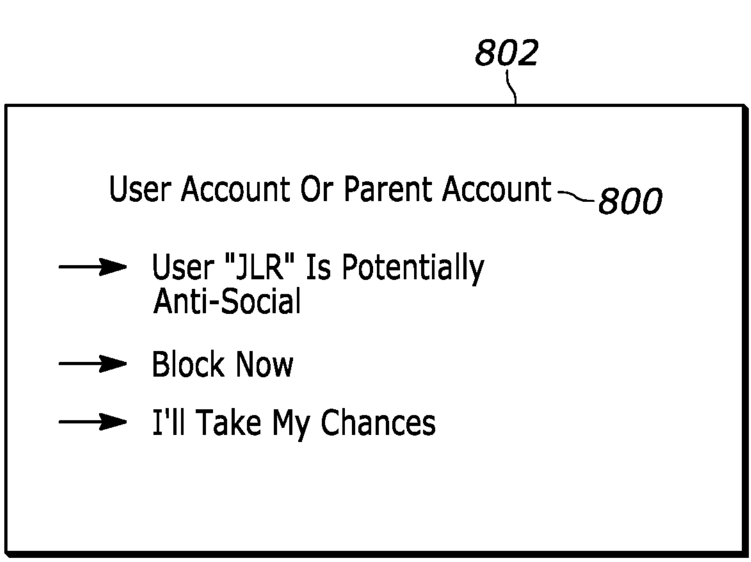
FIG. 8 illustrates an example screen shot from a user or parent computer regarding the AS account.

FIG. 8 illustrates an advisory or warning 800 that can be audibly or visibly presented on a display 802 of a computer logged in to a user account on the network with which the AS account is attempting to message, and/or an account of a parent of a user the AS account is attempting to converse with. In the example shown, the AS account username is JLR, and the warning indicates that user JLR may be dangerous.

One or more selectors 804 may be presented and may be selected by a user or parent to block messages from the AS account immediately, not block the AS account messaging, and/or cause other actions.

Figure 9:
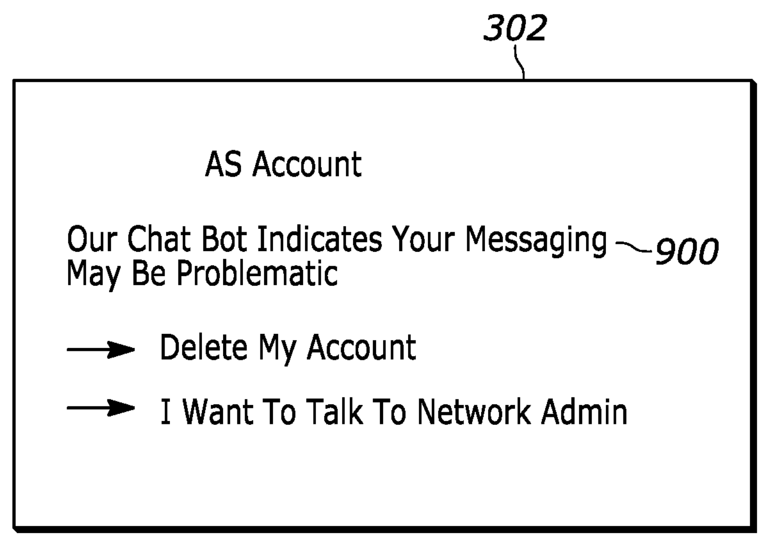
FIG. 9 illustrates an example screen shot from a computer hosting the AS account.

FIG. 9 illustrates an advisory or warning 900 that can be audibly or visibly presented on a display of the computer 302 logged in to the AS account on the network. The advisory 900 indicates that the messaging from the AS computer 302 may be problematic or suspicious. One or more selectors 904 may be presented and may be selected by a person operating the computer 302 to delete the AS account, to open communications with a network administrator to plead the case of the AS 300, or other actions.

Figure 10:
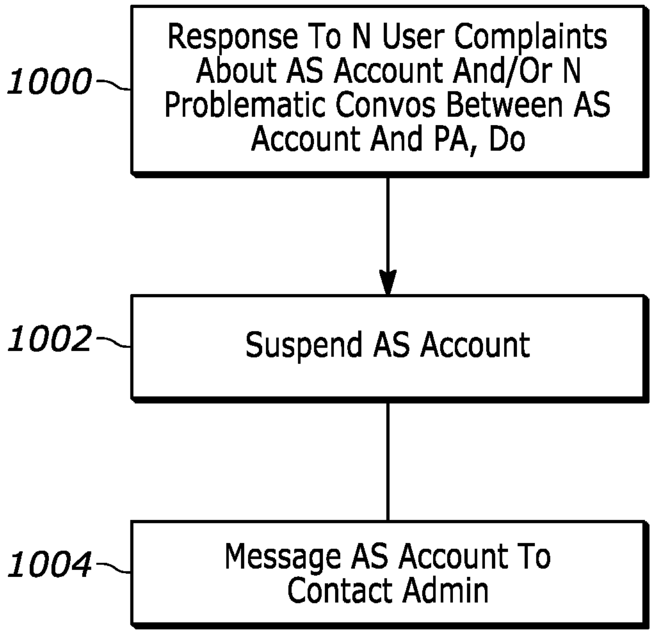
FIG. 10 illustrates further logic in example flow chart format for suspending the AS account.

FIG. 10 illustrates further logic consistent with present principles. Block 1000 indicates that N user complaints may have been received related to the AS account, with N being an integer greater than one. In addition or alternatively, block 1000 indicates that N problematic messaging conversations have been had between the AS account and the PA, i.e., conversations which the GPTT or human monitors flag as "suspicious".

If either one or both of the conditions in block 1000 are met as established by the network administrator, the AS account is suspended from messaging on the social network at block 1002. A message may be sent at block 1004 to the AS account that it is suspended pending contact with a network administrator.

Examples of messaging behavior that may indicate an anti-social user include requesting personal information, whether the AS account gives unsolicited gifts to other users, whether the AS user changes accounts frequently, whether the AS user exhibits off game behavior, i.e., not really playing a computer game hosting messaging, and use of short-term "burner". Other AS behavior such as spam behavior includes an account having few or no friends, a high block rate from other accounts, no spending from the account. This same behavior may indicate predatory behavior particularly when coupled to an affinity of an account to play games favored by minors, asking for age and interests, which gifts are preferred, and requesting re-contact on other networks (platform hop requests).

Once flagged, moderators look at messages-moderators only need to look over suspicious accounts.

While the particular embodiments are herein shown and described in detail, it is to be understood that the subject matter which is encompassed by the present invention is limited only by the claims.

What is claimed is:

1. A system comprising:

at least one non-transitory computer medium comprising instructions executable by at least one processor assembly to:

generate a pseudo account, the pseudo account accessing at least one large language model (LLM) to appear as a peer user account;

identify a first account associated with a user, wherein an input of the user via an input device requests establishing communication with the pseudo account;

communicate, using the pseudo account, with the first account, wherein the communication includes the LLM generating a multi-turn natural language dialog, and wherein at least a portion of the multi-turn natural language dialog is presented to the first account as originating from the peer user account;

determine, by processing data of the communication using an analysis model that is separate from the LLM, that the first account exhibits a first characteristic;

determine, based on the first characteristic, that the first account is to be further monitored without restricting the first account; and generate an advisory warning based on the first account establishing a communication with a second account.

2. The system of claim 1, wherein an account to which the advisory warning that the first account exhibits the first characteristic comprises at least a user account.

3. The system of claim 1, wherein an account to which the advisory warning that the first account exhibits the first characteristic comprises at least a social network administrator account.

4. The system of claim 1, wherein the LLM comprises at least one generative pre-trained transformer (GPTT).

5. The system of claim 1, wherein the instructions are executable to present the advisory warning to an account before any communication is established by the first account with the second account.

6. The system of claim 1, wherein the LLM is trained to mimic a behavior of a demographic associated with potential victims to the first account.

7. The system of claim 6, wherein the LLM is trained to mimic a messaging behavior of a demographic associated with potential victims to the first account.

8. The system of claim 1, wherein the advisory warning comprises:

a warning that the first account is potentially anti-social;

an option for the second account to block further communications from the first account; or an option for the second account to continue receiving communications from the first account.

9. A method comprising:

generating a pseudo account, the pseudo account accessing at least one large language model (LLM) to appear as a peer user account;

identifying a first account associated with a user, wherein an input of the user via an input device requests establishing communication with the pseudo account;

communicating, using the pseudo account, with the first account, wherein the communication includes the LLM generating a multi-turn natural-language dialog, and wherein at least a portion of the multi-turn natural-language dialog is presented to the first account as originating from the peer user account;

determining, by processing data of the communication using an analysis model that is separate from the LLM, that the first account exhibits a first characteristic;

determining, based on the first characteristic, that the first account is to be further monitored without restricting the first account; and generating an advisory warning based on the first account establishing a communication with a second account.

10. The method of claim 9, wherein the first characteristic comprises predatory behavior.

11. The method of claim 9, wherein the large language model (LLM) is trained to mimic a behavior of a demographic associated with potential victims to the first account.

12. The method of claim 11, wherein the LLM comprises at least one generative pre-trained transformer (GPTT).

13. The method of claim 9, comprising:

responsive to at least one of a predetermined number of user complaints regarding the first account and plural indications the first account exhibits the first characteristic in respective plural communication sessions between the pseudo account and the first account, suspending the first account.

14. An apparatus, comprising:

at least one processor assembly configured to:

generate a pseudo account, the pseudo account accessing at least one large language model (LLM) to appear as a peer user account;

identify a first account associated with a user, wherein an input of the user via an input device requests establishing communication with the pseudo account;

communicate, using the pseudo account, with the first account, wherein the communication includes the LLM generating a multi-turn natural-language dialog, and wherein at least a portion of the multi-turn natural-language dialog is presented to the first account as originating from the peer user account;

determine, by processing data of the communication using an analysis model that is separate from the LLM, that the first account exhibits a first characteristic;

determine, based on the first characteristic, that the first account is to be further monitored without restricting the first account; and generate an advisory warning based on the first account establishing a communication with a second account.

15. The apparatus of claim 14, wherein the processor is configured to present the advisory warning on a computer hosting a user account with which the first account attempts to establish communication with.

16. The apparatus of claim 14, wherein the processor is configured to present the advisory warning on a computer hosting a parent account associated with a user account with which the first account attempts to establish communication with.

17. The apparatus of claim 14, wherein the processor is configured to present the advisory warning on a computer hosting a social network administrator account.

18. The apparatus of claim 14, wherein the processor is configured to provide to a computer other than a computer hosting the first account at least one selector selectable to block the first account.

19. The apparatus of claim 14, wherein the processor is configured to provide to the second account an indication that the first account may be problematic.

20. The apparatus of claim 19, wherein the processor is configured to provide to the second account, along with the indication that the first account may be problematic, an option to contact a social network administrator.

* * * * *